(12) United States Patent
Kovalchuk

(10) Patent No.: US 11,795,788 B2
(45) Date of Patent: Oct. 24, 2023

(54) THERMOSET SWELLABLE DEVICES AND METHODS OF USING IN WELLBORES

(71) Applicant: Anton Kovalchuk, Houston, TX (US)

(72) Inventor: Anton Kovalchuk, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 171 days.

(21) Appl. No.: 17/347,872

(22) Filed: Jun. 15, 2021

(65) Prior Publication Data

US 2022/0003081 A1 Jan. 6, 2022

Related U.S. Application Data

(63) Continuation-in-part of application No. 16/919,376, filed on Jul. 2, 2020, now Pat. No. 11,525,341.

(51) Int. Cl.
*E21B 43/10* (2006.01)
*E21B 43/02* (2006.01)

(52) U.S. Cl.
CPC ............ *E21B 43/108* (2013.01); *E21B 43/02* (2013.01)

(58) Field of Classification Search
CPC ............................ E21B 43/02; E21B 43/108
See application file for complete search history.

(56) References Cited

U.S. PATENT DOCUMENTS

| 7,318,481 | B2 * | 1/2008 | Richard | ................ | E21B 43/086 |
| | | | | | 166/227 |
| 7,743,835 | B2 | 6/2010 | Willauer | | |
| 7,828,055 | B2 | 11/2010 | Willauer et al. | | |
| 7,832,490 | B2 | 11/2010 | Willauer | | |
| 8,604,157 | B2 | 12/2013 | Gerrard et al. | | |
| 8,672,023 | B2 | 3/2014 | O'Malley | | |
| 8,678,100 | B2 | 3/2014 | Guest et al. | | |
| 8,763,687 | B2 | 7/2014 | Ingram et al. | | |
| 8,783,349 | B2 | 7/2014 | Robisson et al. | | |
| 8,939,222 | B2 | 1/2015 | Ren et al. | | |
| 9,068,437 | B2 | 6/2015 | Carrejo et al. | | |

(Continued)

FOREIGN PATENT DOCUMENTS

| CN | 110591676 A | 12/2019 |
| WO | 2008151311 | 12/2008 |

(Continued)

OTHER PUBLICATIONS

International Search Report for International Applicaiton No. PCT/US2021/070817, International Filing Date Jul. 1, 2021, dated Oct. 20, 2021, 4 pages.

(Continued)

*Primary Examiner* — Robert E Fuller
(74) *Attorney, Agent, or Firm* — CANTOR COLBURN LLP

(57) ABSTRACT

A fluid control device includes a filtration component, which has a porous filtration medium. The filtration medium contains a shape memory thermoset material foamed with a polymeric microsphere and a gas-producing chemical foaming agent. The porous filtration medium is configured to be compacted from an initial shape to a compacted shape, deployed in the borehole, and subsequently expanded to conform to a surface of the borehole.

17 Claims, 3 Drawing Sheets

(56) References Cited

U.S. PATENT DOCUMENTS

| | | |
|---|---|---|
| 9,144,925 B2 | 9/2015 | Ren et al. |
| 9,260,568 B2 | 2/2016 | Ren et al. |
| 9,303,485 B2 | 4/2016 | Hecker et al. |
| 9,322,248 B2 | 4/2016 | Yeh et al. |
| 9,638,012 B2 | 5/2017 | Yeh et al. |
| 9,670,756 B2 | 6/2017 | Yeh |
| 9,850,733 B2 | 12/2017 | Fripp et al. |
| 9,878,486 B2 | 1/2018 | Liu et al. |
| 10,138,701 B2 | 11/2018 | Fripp et al. |
| 10,508,185 B2 | 12/2019 | Murugesan et al. |
| 10,577,897 B2 | 3/2020 | Flores Perez et al. |
| 2007/0240877 A1 | 10/2007 | O'Malley et al. |
| 2009/0173497 A1 | 7/2009 | Dusterhoft |
| 2011/0073296 A1* | 3/2011 | Richard ............... E21B 43/082 29/458 |
| 2011/0160101 A1 | 6/2011 | Naderhoff et al. |
| 2012/0067587 A1 | 3/2012 | Agrawal et al. |
| 2013/0292117 A1 | 11/2013 | Robisson et al. |
| 2014/0020910 A1 | 1/2014 | Falkner et al. |
| 2014/0332220 A1 | 11/2014 | Garza et al. |
| 2015/0361760 A1 | 12/2015 | McClung, III |
| 2016/0160617 A1 | 6/2016 | Garza et al. |
| 2017/0009552 A1 | 1/2017 | Fripp et al. |
| 2017/0044880 A1 | 2/2017 | Yeh et al. |
| 2017/0138147 A1* | 5/2017 | Trivedi ................. F16J 15/068 |
| 2017/0356269 A1 | 12/2017 | Denton |
| 2019/0292877 A1 | 9/2019 | Flores Perez et al. |
| 2019/0390058 A1* | 12/2019 | Kenkare ............... C08J 9/0061 |
| 2020/0080401 A1 | 3/2020 | Sherman |
| 2022/0003084 A1 | 1/2022 | Kovalchuk et al. |

FOREIGN PATENT DOCUMENTS

| | | |
|---|---|---|
| WO | 2016081287 A1 | 5/2016 |
| WO | 2019140180 A1 | 7/2019 |

OTHER PUBLICATIONS

International Search Report for International Application No. PCT/US2021/070816, International Filing date Jul. 1, 2021, dated Oct. 21, 2021, 6 pages.

Written Opinion for International Applicaiton No. PCT/US2021/070817, International Filing Date Jul. 1, 2021, dated Oct. 20, 2021, 6 pages.

Written Opinion for International Application No. PCT/US2021/070816, International Filing date Jul. 1, 2021, dated Oct. 21, 2021, 7 pages.

* cited by examiner

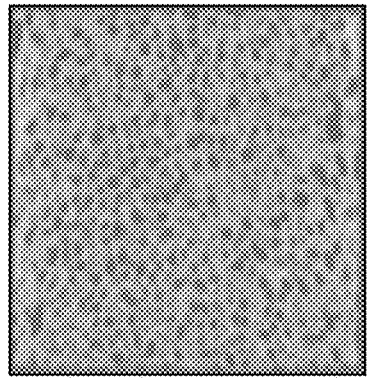 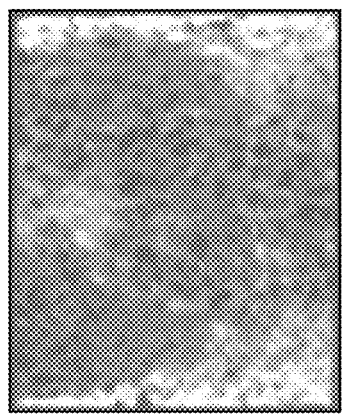 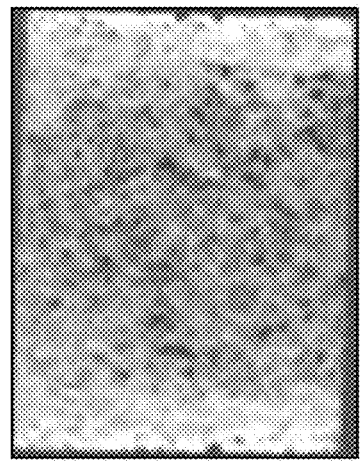
FIG.2A  FIG.2B  FIG.2C
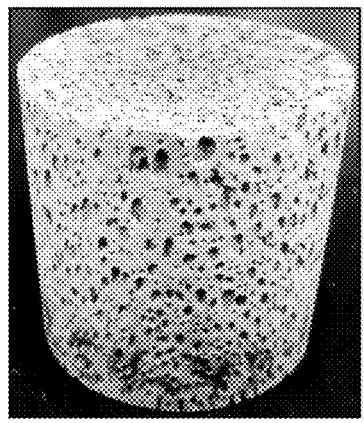 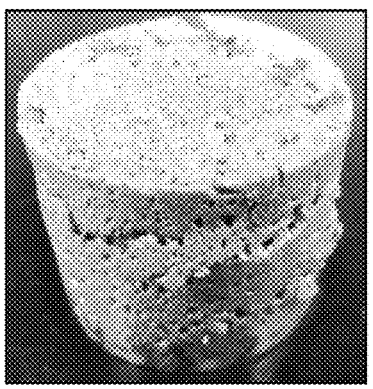 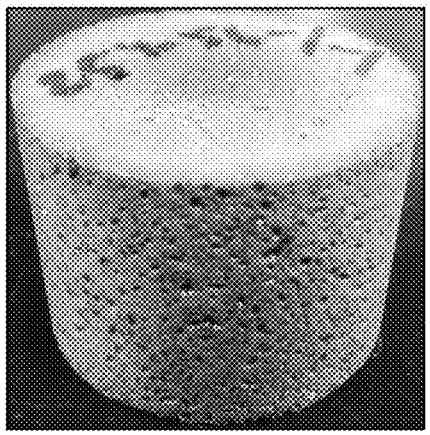
FIG.3A  FIG.3B  FIG.3C

THERMOSET SWELLABLE DEVICES AND METHODS OF USING IN WELLBORES

CROSS-REFERENCE TO RELATED APPLICATION

This application is a continuation-in-part of U.S. patent application Ser. No. 16/919,376, filed on Jul. 2, 2020, the content of which is incorporated herein in its entirety by reference.

BACKGROUND

Various tools are utilized in subterranean operations, such as hydrocarbon exploration, drilling and completion operations, to increase or maximize production efficiency. Sand control devices such as sand screens are utilized to control the ingress of particulate contaminants into production fluid and to aid in stabilizing production formations. Examples of sand control devices include screen assemblies having conformable sleeves or components that are expanded downhole. In some cases, high temperature conditions experienced downhole can affect the performance such sand control devices.

BRIEF DESCRIPTION OF THE INVENTION

A fluid control device comprises a filtration component including a porous filtration medium comprising a shape memory thermoset material foamed with a polymeric microsphere and a gas-producing chemical foaming agent, wherein the porous filtration medium is configured to be compacted from an initial shape to a compacted shape, deployed in the borehole, and subsequently expanded to conform to a surface of the borehole.

A fluid control method comprises deploying a fluid control device in a borehole, the fluid control device including a support structure and a filtration component disposed at the support structure, the filtration component including a porous filtration medium comprising a shape memory thermoset material foamed with a polymeric microsphere and a gas-producing chemical foaming agent, wherein the fluid control device is deployed when the porous filtration medium is in a compacted shape; activating the porous filtration medium to cause the porous filtration medium to expand, and conform to a surface of the borehole; and flowing a fluid through the porous filtration medium.

BRIEF DESCRIPTION OF THE DRAWINGS

The following descriptions should not be considered limiting in any way. With reference to the accompanying drawings, like elements are numbered alike:

FIGS. 2A-2C are X-Ray (CT scan) images of the original epoxy foams made from Formulations 1-3 respectively;

FIGS. 3A-3C show epoxy foams made from Formulations 1-3 after compaction/shape recovery.

DETAILED DESCRIPTION

Figure 1:
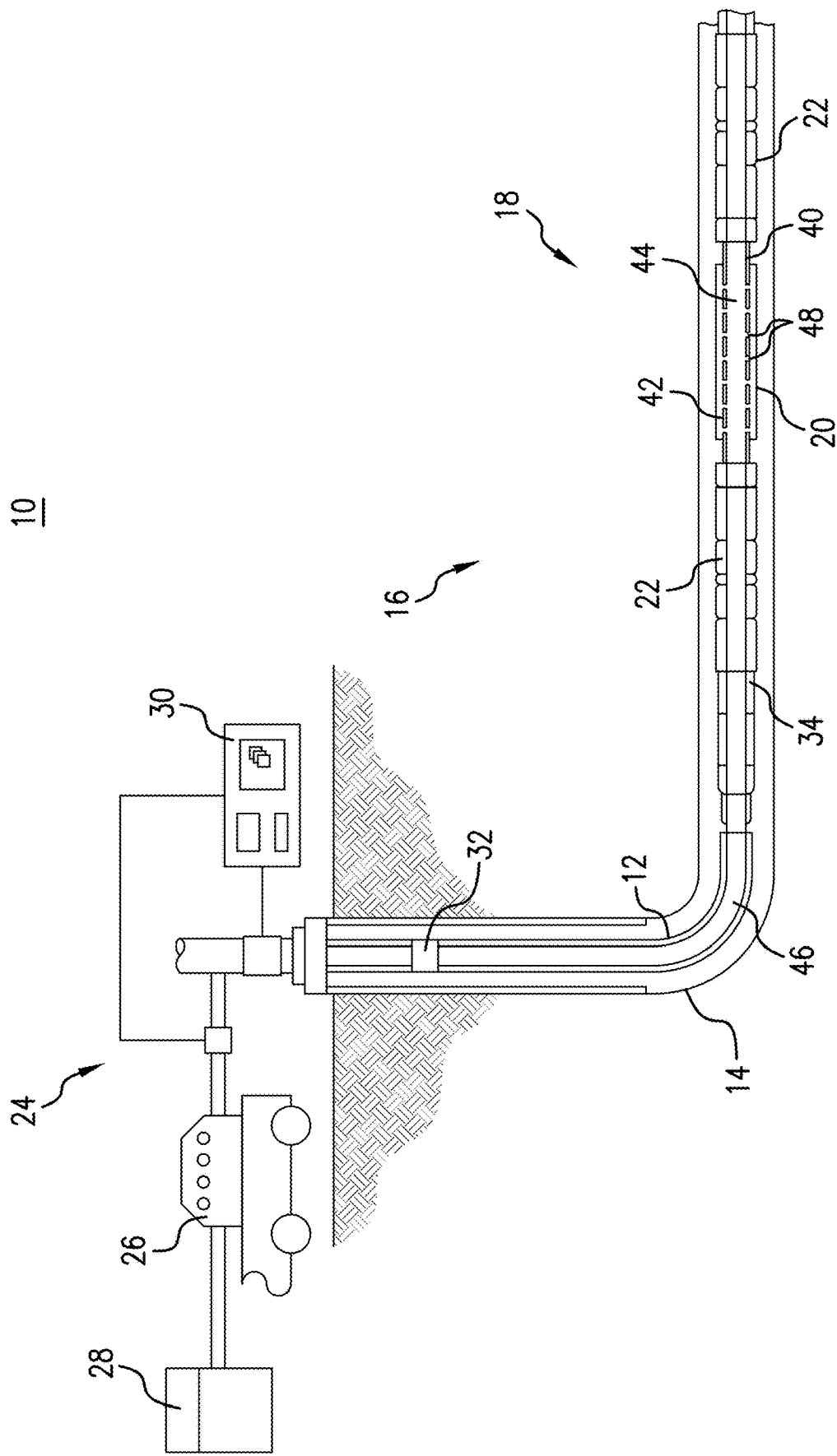
FIG. 1 depicts an embodiment of a downhole completion and/or production system including an expandable and conformable screen assembly.

Devices, systems and methods for filtering fluid (e.g., filtering sand and other undesirable material from fluid in a downhole environment) are described herein. A fluid control device or tool includes a porous filtration medium comprising a shape memory thermoset polymer such as an epoxy polymer foamed with a polymeric microsphere and a gas-producing chemical foaming agent. The porous filtration medium allows fluid to flow through while blocking undesirable materials. For example, the porous filtration medium is included in a fluid control device such as a sand screen, for filtering fluid entering the fluid control device, e.g., production fluid including formation fluids such as oil and hydrocarbon gas. The shape memory characteristics of the thermoset polymer allow for the filtration medium to be configured as an expandable and conformable sand screen or other fluid control device.

The filtration media described herein exhibit a combination of good mechanical properties and permeability. The filtration media also have good heat resistance (e.g., at temperatures up to about 275 degrees F., or higher). The filtration media and screen assemblies described herein can thus be used in higher temperature environments than conventional screens and conventional shape memory devices, and may be a viable alternative to gravel packing systems.

The porous filtration medium can comprise a shape memory thermoset polymer such as an epoxy polymer foamed with a polymeric microsphere and a gas-producing chemical foaming agent.

The shape memory thermoset polymer such as an epoxy polymer has a soft segment unit and a hard segment unit. In an aspect, the soft segment unit is formed from one or more soft segment monomers and the hard segment unit is formed from one or more hard segment monomers.

A "soft segment" monomer in the case of epoxy includes a linear monomer such as bisphenol A diglycidyl ether that typically has lower glass transition temperature (e.g., about 90 degrees C.). A "hard segment" monomer such as novolac epoxy resin provides more rigid polymer structure and higher glass transition temperature than soft segment monomers due to higher degree of crosslinking in a macromolecule. In a shape memory material, hard segments are responsible for the permanent shape and shape-memorizing capability, while soft segments provide elastic recovery properties: they soften upon heating above $T_g$ or harden on cooling below $T_g$.

In an aspect, the soft segment unit is formed from a soft segment monomer such as bisphenol A diglycidyl ether, and the hard segment unit is formed from a hard segment monomer such as phenol-formaldehyde polymer glycidyl ether (CAS #28064-14-4), and an additional hard segment monomer, which is a functional monomer having a functionality that is greater than two (e.g., a trifunctional monomer or higher functionality monomer). In one embodiment, the additional hard segment monomer is a tetrafunctional monomer. The monomer mixtures can be reacted with a curing agent to produce the shape memory epoxy. The resulting epoxy, once cured, can withstand high temperatures (e.g., 250-300 degrees F. or higher) and have a high glass transition temperature (e.g., 340 degrees F.), while also having high chemical resistance.

As a specific example, the epoxy polymer is formed bisphenol A diglycidyl ether, phenol-formaldehyde polymer glycidyl ether, and N,N,N',N'-tetraglycidyl-4,4'-methylenebisbenzenamine, and a curing agent. An amount of the bisphenol A diglycidyl ether is about 20 to 45 wt %, 25 to 40 wt %, or 28 to 38 wt %, an amount of the phenol-formaldehyde polymer glycidyl ether is about 20 to 45 wt %, 25 to 40 wt %, or 28 to 38 wt %, and an amount of the N,N,N',N'-tetraglycidyl-4,4'-methylenebisbenzenamine is 20 to 45 wt %, 25 to 40 wt %, or 28 to 38 wt %, each based on a sum of the weights of the bisphenol A diglycidyl ether, the phenol-formaldehyde polymer glycidyl ether, and the N,N,N',N'-tetraglycidyl-4,4'-methylenebisbenzenamine.

The curing agent includes an active group that can react with an epoxy group. Examples of such an active group include amino groups and acid anhydride groups. In an aspect the curing agent is an aliphatic amine or an aromatic amine, preferably, an aromatic amine. The curing agent can be used in an amount of 15 to 45 parts by weight, about 20 to about 40 parts by weight, or about 25 to about 35 parts by weight, per 100 parts by weight of a sum of the epoxy monomers, for example, per 100 parts by weight of a sum of the weights of the bisphenol A diglycidyl ether, the phenol-formaldehyde polymer glycidyl ether, and the N,N,N',N'-tetraglycidyl-4,4'-methylenebisbenzenamine.

The gas-producing chemical foaming agent comprises one or more of the following: azodicarbonamide, sodium bicarbonate, a combination of sodium carbonate and citric acid, sodium polyacrylate, polypropylene carbonate, isocyanate, or polysiloxane. The gas-producing chemical foaming agent can produce a gas that create pores in response to heat or other activation mechanism.

The polymeric microsphere is preferably an expandable polymeric microsphere. The expandable microsphere can comprise a polymer shell encapsulating a gas or a liquid hydrocarbon having a boiling point of less than about 150° C. or less than about 100° C., or less than about 80° C., or a combination thereof. When heated, the gas encapsulated in the shell expands. In the instance where the core comprises a hydrocarbon having a boiling point as described herein, the liquid hydrocarbon turns into a gas, and the internal pressure from the gas increases. Meanwhile upon heating, the polymer shell softens. Accordingly, with the gas trapped inside the spheres, the volume of the microspheres increases creating pores in the foamed product. Expandable microspheres are commercially available as EXPANCEL (AkzoNobel N.V.), ADVANCELL EM (Sekisui Chemical Co., Ltd.), KUREHA microsphere (Kureha Corp.), DUALITE (Chase Corp.), and CLOCELL (PolyChem Alloy).

The gas-producing chemical foaming agent and the expandable microsphere have a relative weight ratio of about 5:1 to about 1:1, about 4:1 to about 2:1, or about 4:1 to about 3:1. The sum of the weights of the gas-producing agent and the expandable microsphere can be about 2 to about 20 wt %, about 5 wt % to about 15 wt %, or about 8 wt % to about 12 wt %, each based on a total weight of the porous filtration medium.

It was found that the expandable microsphere and the gas-producing chemical foaming agent, when used together, provide foams with a combination of good mechanical properties and permeability as compared to foams produced with only the expandable microsphere or foams produced with only the gas-producing chemical foaming agent. Without wishing to be bound by theory, it is believed that the role of the expandable microspheres is to provide partial expansion of the foam and stabilize the foam structure. The role of the gas producing foaming agent is to create open cells in the foam and make it highly permeable. The gas-producing chemical foaming agent and the polymeric microsphere (physical foaming agent), when used together, provide synergy in properties compared to the materials with only individual foaming agents, resulting in the superior mechanical strength and filtration performance.

The filtration medium can include a toughening additive to improve mechanical performance (e.g., toughness and compressive strength) of the final filtration medium. The toughening additive comprises at least one of a polysulfone or a polyethersulfone. The toughening additive can be present in an amount of about 2 wt % to about 20 wt % or about 5 wt % to about 10 wt %, based on a total weight of the porous filtration medium.

The hard segment monomers and the soft segment monomers can be cured at a temperature of about 100° C. to about 150° C., or about 120° C. to about 180° C. for about 1 hour to 10 hours, about 2 hours to about 8 hours, or about 3 hours to about 7 hours in the presence of the expandable polymeric microsphere and the gas-producing chemical foaming agent, and the optional toughening additive to form the filtration medium. The curing can be conducted in a sealed mold. The mold can have one or more vents to allow the gas generated during curing to exit the mold.

The filtration medium has both open pores and closed pores. The open pores can be present in an amount of about 70 to about 90 volume percent or about 70 to about 85 volume percent based on a sum of the volumes of the open pores and closed pores.

The filtration medium can be compacted from an initial shape, and later activated by heating the medium to a temperature above a glass transition temperature (Tg), to partially or fully recover the initial shape. For example, the medium is compacted at a temperature above the glass transition temperature, and subsequently cooled to retain the compact shape (run-in shape).

Embodiments described herein present a number of advantages. The multi-component thermoset materials, for example epoxy polymers described herein may be formed into various kinds of porous structures. Due to its high chemical and heat resistance, and shape memory properties, filtration medium including the shape memory epoxy can be deployed in high temperature downhole environments and efficiently perform sand filtration functions. In addition, in some embodiments, the filtration medium can survive for extended periods of time (e.g., at least 10 years).

In an embodiment, the porous shape memory foam is disposed on a suitable support structure or otherwise configured as a fluid control device. For example, a cylinder or sleeve of the foam is disposed on a tubular support structure such as a perforated base pipe.

FIG. 1 depicts an example of a system 10 configured to perform a subterranean operation, and illustrates an example of a screen assembly including a conformable and expandable porous filtration medium including a shape memory epoxy. The system 10 in this example is a resource or energy production system 10 that includes a borehole string 12 disposed in a borehole 14 extending into a subterranean region or a resource bearing formation, such as an earth formation 16. It is noted that the porous filtration medium is not limited to this example, and can be incorporated into any suitable downhole device or component.

The borehole string 12 includes a completion string having a production assembly 18. The production assembly 18 includes a screen assembly 20, and may also include a flow control device such as an inflow control device (ICD). The production assembly 18 may include additional components, such as one or more packer assemblies 22 configured to isolate components and/or zones in the borehole 12.

The system 10 also includes surface equipment 24 such as a drill rig, rotary table, top drive, blowout preventer and/or others to facilitate deploying the borehole string 12, operating various downhole components, monitoring downhole conditions and controlling fluid circulation through the borehole 14 and the borehole string 12. For example, the surface equipment 24 may include a fluid control system 26 including one or more pumps in fluid communication with a fluid tank 28 or other fluid source. The fluid control system 28 facilitates injection of fluids, drilling fluid (e.g., drilling mud), stimulation fluid (e.g., a hydraulic fracturing fluid), proppant, and others. The fluid control system 28 or other suitable system may be used to inject a fluid (referred to as an activation fluid) to trigger shape memory recovery as discussed in more detail below.

One or more components of the borehole string 12 may be configured to communicate with a surface location (e.g., the surface equipment 24). The communication may be wired or wireless. A processing device such as a surface processing unit 30 and/or a subsurface processing unit 32 and/or 34, which may be disposed in the borehole 14 and connected to one or more downhole components. The processing device may be configured to perform functions such as controlling downhole components, transmitting and receiving data, processing measurement data and/or monitoring operations. The processing device may also control aspects of fluid circulation and injection, such as controlling injection of an activation fluid.

The screen assembly 20 in this embodiment includes a base pipe 40 and an expandable porous filtration medium 42 having a porous structure that includes a shape memory epoxy. The porous structure may be formed exclusively by the shape memory epoxy, or formed by the shape memory epoxy in combination with other polymers and compounds (e.g., toughening agents). The filtration medium 42 is configured as a foam or other porous structure having a selected porosity. The shape memory thermoset polymer allows the medium 42 to be compressed or compacted into a compacted or run-in shape, and expanded due to downhole temperatures to an expanded shape. In the embodiment of FIG. 1, the medium 42 is configured to expand to a size or diameter sufficient to contact and conform to an annular region of the borehole 14.

The base pipe 40 defines an inner fluid conduit 44 that can be connected to a borehole string or otherwise in fluid communication with a selected location such as a surface location. For example, the inner fluid 44 is in fluid communication with a production conduit 46 connected to the surface. A plurality of holes or other fluid passages 48 provide fluid paths for fluid entering through the porous medium 42 to flow through the base pipe 40 and into the inner fluid conduit 44.

The screen assembly 20 can then be deployed in the borehole 12. When the screen assembly 20 reaches a temperature greater than the Tg, the porous medium 42 expands to recover all or some of the initial shape. The glass transition temperature may be any suitable temperature that is greater than a subterranean temperature. For example, the glass transition temperature may be about 100 degrees C. or greater (e.g., about 120 degrees C.). As discussed further, the glass transition temperature may be lowered (e.g., via an activation fluid or other mechanism).

The filtration medium 42 can be a single layer or multiple layers. In addition, the filtration medium can be made from one type of thermoset or multiple types (e.g., one or more layers of the same epoxy or one or more layers of different epoxies).

The filtration medium 42 may be part of a screen device or assembly that includes additional layers or filtration components. For example, the screen assembly 20 may be made from one or more layers of the filtration medium 42, in combination with one or more additional filtration elements or layers, such as metal screens, wire mesh, polymeric screens, mesh wool, bead screens, perforated sleeves and/or others.

In one embodiment, the porous filtration medium 42 is configured to be expanded via an activation fluid. The activation fluid acts to reduce the glass transition temperature of the medium to a temperature that is at or below the temperature of a downhole environment. For example, the activation fluid is configured to reduce the glass transition temperature to below about 220-250 degrees F., or other temperature level or range encountered downhole. The activation fluid is selected based on considerations including downhole temperature and desired transition temperature.

The ability to lower the transition temperature downhole allows for the filtration medium 42 to be compacted at higher temperatures, which may allow for more compaction. A suitable activation fluid can reduce glass transition temperature so that the more compaction on the surface can be done at higher temperature while achieving expansion at lower glass transition temperature downhole.

The activation fluid may be a water based fluid, such as a brine or water based drilling mud, or an oil based fluid. The fluid is configured to activate the medium 42 and expand it by lowering the Tg temporarily so that downhole temperature causes expansion. Various chemical additives may be included to control aspects of activation, including activation temperature and the rate of expansion.

Although embodiments are discussed in the context of sand control and as part of the system 10, it is to be understood that the embodiments are not so limited. The medium 42 may be configured for any desired downhole application (or surface application) and thus have any suitable shape, size, material composition and chemical composition.

The following is a description of examples of porous shape memory epoxy polymer formulations that can be used as shape memory filtration media. It is noted that the filtration media and shape memory polymers, and monomers included therein, are not limited to the specific examples.

"Comparative Formulation 1" was formed by creating a mixture of 21.08 wt. % of EPON 828 epoxy resin (bisphenol A diglycidyl ether), 21.08 wt. % of EPON 862 epoxy resin (phenol-formaldehyde polymer glycidyl ether), 21.08 wt. % of ALRALDITE MY720 (a tetrafunctional epoxy resin including N,N,N',N'-tetraglycidyl-4,4'-methylenebisbenzenamine), 9.31 wt. % of VIRANTAGE VW 10200 (polyethersulfone), 19.88 wt. % of EPICURE W. curing agent (aromatic amine), and 7.55 wt. % of EXPANCEL 920 DU 120 (expandable polymer microspheres).

"Comparative Formulation 2" was formed by creating a mixture of 21.62 wt. % of EPON 828 epoxy resin (bisphenol A diglycidyl ether), 21.62 wt. % of EPON 862 epoxy resin (phenol-formaldehyde polymer glycidyl ether), 21.62 wt. % of ALRALDITE MY720 (a tetrafunctional epoxy resin including N,N,N',N'-tetraglycidyl-4,4'-methylenebisbenzenamine), 9.55 wt. % of VIRANTAGE VW 10200 (polyethersulfone), 20.38 wt. % of EPICURE W. curing agent (aromatic amine), and 5.2 wt. % of ACTAFOAM 780 (Activated Azodicarbonamide).

"Formulation 3" was formed by creating a mixture of 20.73 wt. % of EPON 828 epoxy resin (bisphenol A diglycidyl ether), 20.73 wt. % of EPON 862 epoxy resin (phenol-formaldehyde polymer glycidyl ether), 20.73 wt. % of ALRALDITE MY720 (a tetrafunctional epoxy resin including N,N,N',N'-tetraglycidyl-4,4'-methylenebisbenzenamine), 9.3 wt. % of VIRANTAGE VW 10200 (polyethersulfone), 19.51 wt. % of EPICURE W. curing agent (aromatic amine), 2 wt. % of EXPANCEL 920 DU 120 (expandable polymer microspheres), and 7 wt. % of ACTAFOAM 780 (Activated Azodicarbonamide).

"Formulation 4" was formed by creating a mixture of 21.0 wt. % of EPON 828 epoxy resin (bisphenol A diglycidyl ether), 21.0 wt. % of EPON 862 epoxy resin (phenol-formaldehyde polymer glycidyl ether), 21.0 wt. % of ALRALDITE MY720 (a tetrafunctional epoxy resin including N,N,N',N'-tetraglycidyl-4,4'-methylenebisbenzenamine), 9.2 wt. % of VIRANTAGE VW 10200 (polyethersulfone), 19.8 wt. % of EPICURE W. curing agent (aromatic amine), 3 wt. % of EXPANCEL 920 DU 120 (expandable polymer microspheres), and 5 wt. % of ACTAFOAM 780 (Activated Azodicarbonamide).

Each of formulations 1-4 was separately loaded into a mold having vents on the top to allow gas generated from foaming agents to leave the mold. The mold was sealed, and the sealed mold was placed in an oven which was pre-heated to about 120-130° C. After 10 minutes, the oven temperature was increased to 150° C., and the sealed mold was heated for another 5 hours to make foams 1-4. Foams 1-4 were tested, and the properties are summarized in Table 1.

The permeability was tested when each sample was in an expanded or recovered state after shape memory recovery in water at room temperature.

The compaction degree is the % of the original height after compaction. Compaction degree=H2/H1*100%, where H2 is the foam height after compaction, and H1 is the original height of the foam.

Expansion degree=(H3−H2)/H2*100%, where H3 is the foam height after expansion (shape recovery).

Shape recovery degree=H3/H1*100%, namely, the ratio between the foam height after shape recovery and the foam's original height before compaction.

TABLE 1

| Foam | Foam Density (g/cm$^3$) | Permeability (Darcy) | Compaction (%) | Expansion (%) | Shape Recovery (%) | Crack resistance |
|---|---|---|---|---|---|---|
| 1 | 0.29 | 0.4 | 40.6 | 142 | 99 | Excellent |
| 2 | 0.24 | N.d. | 32 | 217 | 100 | Poor |
| 3 | 0.26 | 16 | 29 | 240 | 99 | Excellent |
| 4 | 0.27 | 25 | 26 | 282 | 100 | Excellent |

X-Ray (CT scan) images of the original epoxy foams of Formulations 1-3 are shown in FIGS. 2A-2C respectively. The epoxy foam made from comparative Formulation 1 had a closed cell structure, the epoxy foam made from comparative Formulation 2 had an open cell structure, and the epoxy foam made from Formulations 3 and 4 had a predominantly open cell structure.

Epoxy foams made from Formulations 1-3 after compaction/shape recovery are shown in FIG. 3A to FIG. 3C respectively. The images show that epoxy foams made from comparative Formulation 1 and Formulation 3 are not damaged while the epoxy foam made from comparative Formulation 2 is damaged.

The foam made from comparative Formulation 1 remains very strong after shape recovery. However, the foam is not permeable as the fluid permeability of the foam was 0 Darcy.

The foam made from comparative Formulation 2 has a shape recovery efficiency of 100%. The fluid permeability was unmeasurable, but nonetheless the foam appeared to be highly permeable. However, the crack resistance was poor, and the foam broke into pieces after shape recovery.

The foam made from Formula 3 has a shape recovery efficiency of 99%. The foam has excellent crack resistance, and remains strong after the shape recovery with a compressive strength of 400 psi. The foam also is highly permeable and has a fluid permeability of 16 Darcy when measured in water at room temperature.

The foam made from Formula 4 has a shape recovery efficiency of 100%. The foam also has excellent crack resistance and high permeability of 25 Darcy.

The results indicate that combining an expandable microsphere and a gas-producing chemical foaming agent resulted in both mechanically robust and highly permeable foams.

Figure 4:
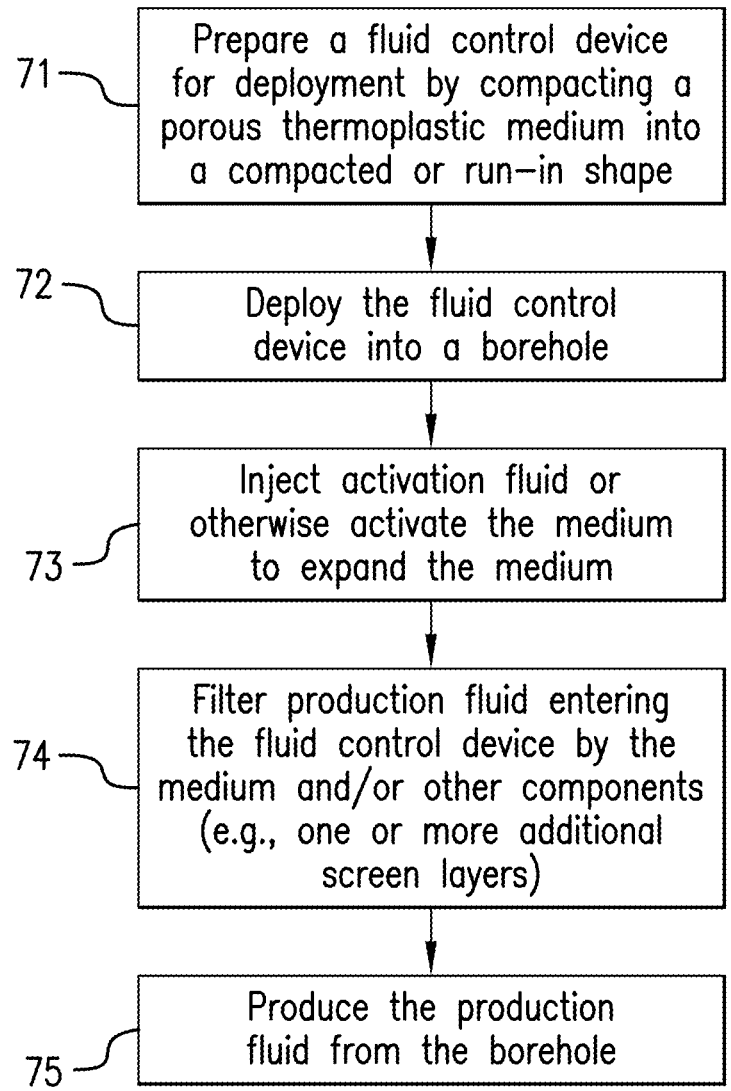
FIG. 4 is a flow diagram depicting a method of controlling fluid flow in a borehole, and/or performing aspects of a downhole or subterranean operation.

FIG. 4 illustrates a method 70 of controlling particulates such as produced sand in a borehole. The method is performed in conjunction with a fluid control device or tool such as the screen assembly 20. The method 70 includes one or more stages 71-75. In one embodiment, the method 70 includes the execution of all of stages 71-75 in the order described. However, certain stages may be omitted, stages may be added, or the order of the stages changed. Although the method 70 is described in conjunction with the screen assembly 20, the method can be utilized in conjunction with any suitable fluid control device or system.

In the first stage 71, at fluid control device or apparatus, such as the screen assembly 20 is prepared for deployment. A porous epoxy filtration medium as described herein (e.g., the medium or conformable sleeve 42) is disposed on a support structure, and is compacted from an initial shape to a smaller diameter shape (a compacted or run-in shape) at a temperature above the Tg of the medium. The medium is then cooled to retain the compacted shape.

In the second stage 72, the device is deployed to a subterranean environment via a borehole. For example, the screen assembly 20 in the compacted state is deployed in the borehole 14 to a selected location, such as a production zone. At this stage, the Tg of the porous medium is above the temperature at the selected subterranean location.

In the third stage 73, the filtration medium 42 is activated to cause the medium to expand into an expanded state, in which some or all of the initial or run-in shape is recovered. For example, the filtration medium 42 may have a Tg below a downhole temperature, and the medium is activated to expand and conform to a surface of the borehole 14 by exposure to a downhole temperature. In another example, the screen assembly 20 and the medium 42 is activated by injecting an activation fluid, such as a water-brine or oil-based liquid, to lower the Tg. The activation fluid causes the Tg of the medium 42 to fall below the downhole temperature, which causes the medium 42 to expand and conform to a surface of the borehole 14.

In the fourth stage 74, production is commenced, and fluid from the subterranean region is drawn through the porous medium. For example, fluid from the formation 16 is drawn through the medium 42 to filter out sand and other undesirable material. In the fifth stage 75, production fluid including fluid from the formation is produced at the surface.

Set forth below are some embodiments of the foregoing disclosure:

Embodiment 1. A fluid control device comprising a filtration component including a porous filtration medium comprising a shape memory thermoset material foamed with a polymeric microsphere and a gas-producing chemical foaming agent, wherein the porous filtration medium is configured to be compacted from an initial shape to a compacted shape, deployed in the borehole, and subsequently expanded to conform to a surface of the borehole.

Embodiment 2. The fluid control device as in any prior embodiment, wherein the polymeric microsphere comprises a polymer shell encapsulating a gas or a liquid hydrocarbon having a boiling point of less than about 150° C., or a combination thereof.

Embodiment 3. The fluid control device as in any prior embodiment, wherein the gas-producing chemical foaming agent comprises one or more of the following: azodicarbonamide, sodium bicarbonate, a combination of sodium carbonate and citric acid, sodium polyacrylate, polypropylene carbonate, isocyanate, or polysiloxane.

Embodiment 4. The fluid control device as in any prior embodiment, wherein the gas-producing chemical foaming agent and the polymeric microsphere have a relative weight ratio of about 5:1 to about 1:1.

Embodiment 5. The fluid control device as in any prior embodiment, wherein the shape memory thermoset polymer comprises an epoxy polymer having a soft segment unit and a hard segment unit.

Embodiment 6. The fluid control device as in any prior embodiment, wherein soft segment unit is formed from bisphenol A diglycidyl ether, and the hard segment is formed from phenol-formaldehyde polymer glycidyl ether and a functional monomer having a functionality that is greater than two.

Embodiment 7. The fluid control device as in any prior embodiment, wherein soft segment unit is formed from bisphenol A diglycidyl ether, and the hard segment is formed from phenol-formaldehyde polymer glycidyl ether and N,N,N',N'-tetraglycidyl-4,4'-methylenebisbenzenamine.

Embodiment 8. The fluid control device as in any prior embodiment, wherein an amount of the bisphenol A diglycidyl ether is about 20 to 45 wt %, an amount of the phenol-formaldehyde polymer glycidyl ether is about 20 to about 45 wt %, and an amount of the N,N,N',N'-tetraglycidyl-4,4'-methylenebisbenzenamine is about 20 to about 45 wt %, each based on a sum of the weights of the bisphenol A diglycidyl ether, the phenol-formaldehyde polymer glycidyl ether, and the N,N,N',N'-tetraglycidyl-4,4'-methylenebisbenzenamine.

Embodiment 9. The fluid control device as in any prior embodiment, wherein an amount of the curing agent comprise at least one of an amino group or an acid anhydride group.

Embodiment 10. The fluid control device as in any prior embodiment, wherein an amount of the curing agent is about 15 to 45 parts by weight, per 100 parts by weight of a sum of the weights of the bisphenol A diglycidyl ether, the phenol-formaldehyde polymer glycidyl ether, and the N,N,N',N'-tetraglycidyl-4,4'-methylenebisbenzenamine.

Embodiment 11. The fluid control device as in any prior embodiment, wherein the porous filtration medium further comprises a toughening additive, the toughening additive comprising at least one of a polysulfone or a polyethersulfone.

Embodiment 12. The fluid control device as in any prior embodiment, wherein the toughening additive is present in an amount of about 2 wt % to about 20 wt % based on a total weight of the porous filtration medium.

Embodiment 13. The fluid control device as in any prior embodiment, wherein the porous filtration medium comprises open pores and closed pores, and the open pores are present in an amount of about 70 to about 90 volume percent based on a sum of the volumes of the open pores and closed pores.

Embodiment 14. The fluid control device as in any prior embodiment, further comprising a support structure including a tubular having a fluid conduit defined therein, wherein the filtration component is disposed at the support structure.

Embodiment 15. The fluid control device as in any prior embodiment, wherein the fluid control device is a screen assembly, the porous filtration medium being at least one layer disposed on an outer surface of the tubular and at least partially surrounding the tubular.

Embodiment 16. A fluid control method comprising: deploying a fluid control device in a borehole, the fluid control device including a support structure and a filtration component disposed at the support structure, the filtration component including a porous filtration medium comprising a shape memory thermoset material foamed with a polymeric microsphere and a gas-producing chemical foaming agent, wherein the fluid control device is deployed when the porous filtration medium is in a compacted shape; activating the porous filtration medium to cause the porous filtration medium to expand, and conform to a surface of the borehole; and flowing a fluid through the porous filtration medium.

Embodiment 17. The method as in any prior embodiment, wherein the gas-producing chemical foaming agent and the expandable microsphere have a relative weight ratio of about 5:1 to about 1:1.

Embodiment 18. The method as in any prior embodiment, wherein the shape memory material comprises an epoxy polymer.

Embodiment 19. The method as in any prior embodiment, wherein the epoxy polymer is formed bisphenol A diglycidyl ether, a phenol-formaldehyde polymer glycidyl ether, and N,N,N',N'-tetraglycidyl-4,4'-methylenebisbenzenamine, and a curing agent.

Embodiment 20. The method as in any prior embodiment, wherein the porous filtration medium comprises open pores and closed pores, and the open pores are present in an amount of about 70 to about 90 volume percent based on a sum of the volumes of the open pores and closed pores.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not to be limited to the particular embodiment disclosed as the best mode contemplated for carrying out this invention, but that the invention will include all embodiments falling within the scope of the appended claims.

The invention claimed is:

1. A fluid control device comprising a filtration component including a porous filtration medium comprising a shape memory thermoset material foamed with a polymeric microsphere and a gas-producing chemical foaming agent, wherein the porous filtration medium is configured to be compacted from an initial shape to a compacted shape, deployed in the borehole, and subsequently expanded to conform to a surface of the borehole, and the porous filtration medium comprises the polymeric microsphere, wherein the shape memory thermoset polymer comprises an epoxy polymer having a soft segment unit and a hard segment unit, and the hard segment is formed from phenol-formaldehyde polymer glycidyl ether and a functional monomer having a functionality that is greater than two.

2. The fluid control device of claim 1, wherein the polymeric microsphere comprises a polymer shell encapsulating a gas or a liquid hydrocarbon having a boiling point of less than about 150° C., or a combination thereof.

3. The fluid control device of claim 1, wherein the gas-producing chemical foaming agent comprises one or more of the following: azodicarbonamide, sodium bicarbonate, a combination of sodium carbonate and citric acid, sodium polyacrylate, polypropylene carbonate, isocyanate, or polysiloxane.

4. The fluid control device of claim 1, wherein the gas-producing chemical foaming agent and the polymeric microsphere have a relative weight ratio of about 5:1 to about 1:1.

5. The fluid control device of claim 1, wherein the soft segment unit is formed from bisphenol A diglycidyl ether, and the hard segment is formed from phenol-formaldehyde polymer glycidyl ether and N,N,N',N'-tetraglycidyl-4,4'-methylenebisbenzenamine.

6. The fluid control device of claim 5, wherein an amount of the bisphenol A diglycidyl ether is about 20 to 45 wt %, an amount of the phenol-formaldehyde polymer glycidyl ether is about 20 to about 45 wt %, and an amount of the N,N,N',N'-tetraglycidyl-4,4'-methylenebisbenzenamine is about 20 to about 45 wt %, each based on a sum of the weights of the bisphenol A diglycidyl ether, the phenol-formaldehyde polymer glycidyl ether, and the N,N,N',N'-tetraglycidyl-4,4'-methylenebisbenzenamine.

7. The fluid control device of claim 6, wherein an amount of the curing agent comprise at least one of an amino group or an acid anhydride group.

8. The fluid control device of claim 6, wherein an amount of the curing agent is about 15 to 45 parts by weight, per 100 parts by weight of a sum of the weights of the bisphenol A diglycidyl ether, the phenol-formaldehyde polymer glycidyl ether, and the N,N,N',N'-tetraglycidyl-4,4'-methylenebisbenzenamine.

9. The fluid control device of claim 1, wherein the porous filtration medium further comprises a toughening additive, the toughening additive comprising at least one of a polysulfone or a polyethersulfone.

10. The fluid control device of claim 9, wherein the toughening additive is present in an amount of about 2 wt % to about 20 wt % based on a total weight of the porous filtration medium.

11. The fluid control device of claim 1, wherein the porous filtration medium comprises open pores and closed pores, and the open pores are present in an amount of about 70 to about 90 volume percent based on a sum of the volumes of the open pores and closed pores.

12. The fluid control device of claim 1, further comprising a support structure including a tubular having a fluid conduit defined therein, wherein the filtration component is disposed at the support structure.

13. The fluid control device of claim 12, wherein the fluid control device is a screen assembly, the porous filtration medium being at least one layer disposed on an outer surface of the tubular and at least partially surrounding the tubular.

14. A fluid control method comprising:
deploying a fluid control device in a borehole, the fluid control device including a support structure and a filtration component disposed at the support structure, the filtration component including a porous filtration medium comprising a shape memory thermoset material foamed with a polymeric microsphere and a gas-producing chemical foaming agent, wherein the porous filtration medium comprises the polymeric microsphere, and the fluid control device is deployed when the porous filtration medium is in a compacted shape;
activating the porous filtration medium to cause the porous filtration medium to expand, and conform to a surface of the borehole; and
flowing a fluid through the porous filtration medium,
wherein the shape memory thermoset polymer comprises an epoxy polymer having a soft segment unit and a hard segment unit, and the hard segment is formed from phenol-formaldehyde polymer glycidyl ether and a functional monomer having a functionality that is greater than two.

15. The method of claim 14, wherein the gas-producing chemical foaming agent and the expandable microsphere have a relative weight ratio of about 5:1 to about 1.1.

16. The method of claim 14, wherein the epoxy polymer is formed from bisphenol A diglycidyl ether, a phenol-formaldehyde polymer glycidyl ether, and N,N,N',N'-tetraglycidyl-4,4'-methylenebisbenzenamine, and a curing agent.

17. The method of claim 14, wherein the porous filtration medium comprises open pores and closed pores, and the open pores are present in an amount of about 70 to about 90 volume percent based on a sum of the volumes of the open pores and closed pores.

* * * * *